United States Patent
Hwa et al.

(10) Patent No.: US 10,532,767 B2
(45) Date of Patent: Jan. 14, 2020

(54) SYSTEMS AND METHODS FOR DETERMINING STEERING PERFORMANCE

(71) Applicant: GM GLOBAL TECHNOLOGY OPERATIONS LLC, Detroit, MI (US)

(72) Inventors: Ian Y. Hwa, West Bloomfield, MI (US); Bo Yu, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 94 days.

(21) Appl. No.: 15/840,974

(22) Filed: Dec. 13, 2017

(65) Prior Publication Data

US 2019/0176876 A1 Jun. 13, 2019

(51) Int. Cl.
*B62D 5/04* (2006.01)
*G07C 5/08* (2006.01)

(52) U.S. Cl.
CPC .......... *B62D 5/0481* (2013.01); *B62D 5/046* (2013.01); *B62D 5/0457* (2013.01); *G07C 5/0808* (2013.01)

(58) Field of Classification Search
CPC .... B62D 5/0481; B62D 5/046; B62D 5/0457; G07C 5/0808
See application file for complete search history.

(56) References Cited

U.S. PATENT DOCUMENTS

| | | | |
|---|---|---|---|
| 2003/0055546 A1* | 3/2003 | Demerly | B62D 5/001 701/42 |
| 2004/0162655 A1* | 8/2004 | Patankar | B62D 5/0463 701/41 |
| 2006/0112382 A1* | 5/2006 | Glass | G05B 19/0426 717/168 |
| 2009/0012773 A1* | 1/2009 | Glass | G05B 19/0426 703/21 |
| 2009/0143871 A1* | 6/2009 | Gao | G05B 13/04 700/29 |
| 2013/0304326 A1* | 11/2013 | Van Dongen | B60W 30/12 701/42 |
| 2016/0305852 A1* | 10/2016 | Oblizajek | G01M 17/06 |
| 2016/0362118 A1* | 12/2016 | Mollicone | B60W 40/09 |
| 2018/0308296 A1* | 10/2018 | Dan | B62D 5/04 |
| 2019/0118855 A1* | 4/2019 | Yu | B62D 5/001 |

* cited by examiner

Primary Examiner — Russell Frejd
(74) Attorney, Agent, or Firm — Lorenz & Kopf, LLP

(57) ABSTRACT

Methods and apparatus are provided for determining steering performance. The method includes: generating a torque disturbance signal; applying the torque disturbance signal to a torque command of the steering system; measuring a value of torque on the steering system; recording the measured value and a value associated with the torque disturbance signal; computing at least one performance metric of the steering system based on the recorded measured value and the recorded value associated with the torque disturbance signal; and selectively improving a steering system based on the at least one performance metric.

19 Claims, 4 Drawing Sheets

SYSTEMS AND METHODS FOR DETERMINING STEERING PERFORMANCE

TECHNICAL FIELD

The present disclosure generally relates to steering systems and more particularly relates to systems and methods for determining performance of an electric power steering system.

BACKGROUND

Many vehicles include a steering system to enable the operator to maneuver or steer the vehicle. In one example, the steering system includes a steering gear coupled to a hand wheel. The steering gear transmits the operator input from the hand wheel to the one or more road wheels. In some instances, steering gears may transmit vibrations from the one or more road wheels to the operator. Such vibrations may be undesirable to the operator.

In some instances, unintended vibrations can be present in the steering system due to low stability margins. This type of vibration is induced by resonant frequencies in the electromechanical components of the steering system, electronic control system, the design of the control and communication systems, and/or the change of electromechanical properties during a life cycle of a vehicle. Instability of the steering system can cause excessive vibration which can be undesirable to an operator.

Accordingly, it is desirable to provide systems and methods for determining steering performance to reduce undesired vibrations. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for determining a performance of a steering system. The method includes: generating a torque disturbance signal; applying the torque disturbance signal to a torque command of the steering system; measuring a value of torque on the steering system; recording the measured value and a value associated with the torque disturbance signal; computing at least one performance metric of the steering system based on the recorded measured value and the recorded value associated with the torque disturbance signal; and selectively improving a steering system based on the at least one performance metric.

In one embodiment, a system includes a torque disturbance source that generates a torque disturbance signal; a measured torque source that generates measured torque data based on a torque measured from the steering system; and a diagnostic module that, by a processor, receives the torque disturbance signal and the measured torque data, computes at least one performance metric of the steering system based on the torque disturbance signal and the measured torque data, and outputs one or more signals used to improve control of the steering system based on the at least one performance metric.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
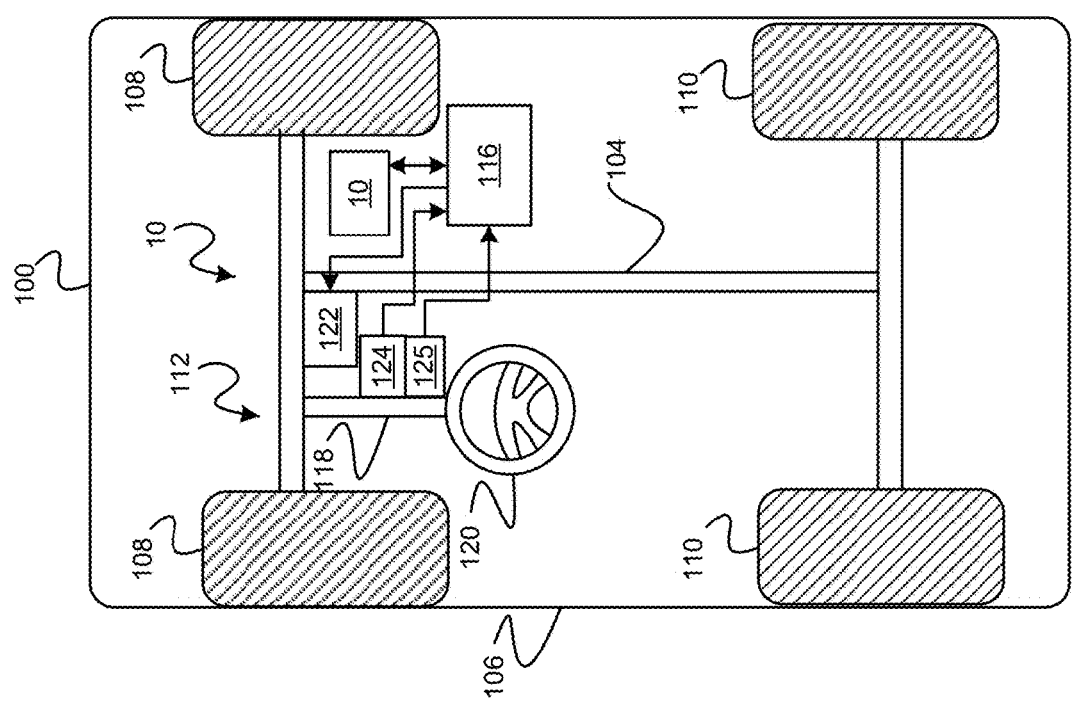
FIG. 1 is a functional block diagram of a system of a vehicle for determining steering performance in accordance with various embodiments.

With reference to FIG. 1, one example of a system 10 for determining performance metrics of a steering system 112 is shown. As will be discussed further herein, the system 10 enables the determination of performance metrics of the steering system 112. The system 10 further enables the use of the determined performance metrics to improve the control of the steering system 112.

In various embodiments, the steering system 112 is associated with a vehicle 100. In various embodiments, the vehicle 100 may be an automobile, an aircraft, a spacecraft, a watercraft, a sport utility vehicle, or any other type of vehicle. For exemplary purposes the disclosure will be discussed in the context of the steering system 112 being used with an automobile. As depicted in FIG. 1, the vehicle 100 generally includes a chassis 104, a body 106, front wheels 108, rear wheels 110, the steering system 112, and a control module 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

The steering system 112 includes a steering column 118 and a steering wheel 120. In various embodiments, the steering system 112 further includes various other features (not depicted in FIG. 1), such as a steering gear, intermediate connecting shafts between the column and the gear, connection joints, either flexible or rigid, allowing desired articulation angles between the intermediate connecting shafts, and tie-rods. The steering gear, in turn, comprises a rack, input shaft, and internal gearing. In various embodiments, the above described methods and systems can also be implemented for steer-by-wire systems. Steer-by-wire systems use electrical and/or electro-mechanical systems to control the vehicle (e.g., steering) instead of traditional mechanical linkages. For example, a steer-by-wire system can use electromechanical actuators and human-machine interfaces (e.g., a steering feel emulator, etc.) to control the vehicle. Accordingly, mechanical components such as the steering intermediate shaft and other associated components are not needed to control the vehicle.

In various embodiments, the steering system 112 is an Electric Power Steering system (EPS) that includes a motor 122 that is coupled to the steering system 112, and that provides torque or force to a rotatable or translational member of the steering system 112 (referred to as assist torque). The motor 122 can be coupled to the rotatable shaft of the steering column 118 or to the rack of the steering gear. In the case of a rotary motor, the motor 122 is typically connected through a geared or belt-driven configuration enabling a favorable ratio of motor shaft rotation to either column shaft rotation or rack linear movement. The steering system 112 in turn influences the steerable front road wheels 108 during steering based upon the assist torque received from the motor 122 along with any torque received from a driver of the vehicle 100 via the steering wheel 120.

The steering system 112 further includes one or more sensors that sense observable conditions of the steering system 112. In various embodiments, the steering system 112 includes a torque sensor 124 and steering position sensor 125. The torque sensor 124 senses a rotational torque applied to the steering system by for example, a driver of the vehicle 100 via the steering wheel 120 and generates torque signals based thereon. The steering position sensor 125 senses an angular position of the steering system 112 and generates a sensor signal based thereon. The control module 116 receives the sensor signals and controls operation of the steering system 112 based thereon. In general, the control module 116 generates control signals to the motor to control the amount of motor torque provided to the steering system 112. In various embodiments, the control module 116 includes any number of modules that are communicatively coupled by way of a communication bus and the control logic of the steering system 112 can reside on any one of the control modules.

In various embodiments, the control module 116 generates the control signals based directly on the determined performance metrics and/or based on values derived from the methods and systems of the present disclosure. In case of low stability margin is detected, both 136 and 116 can be modified to improve stability margin. Generally, the modification of 136 and 116 are not done in real time. Instead, the modification results in another design iteration. For example, if a low stability margin is detected, stability margins can be improved by changing calibrations implemented by steering control algorithms, improving control algorithm functions, and/or by changing mechanical properties of the steering system 112 such as dampers and/or bushings.

Figure 2:
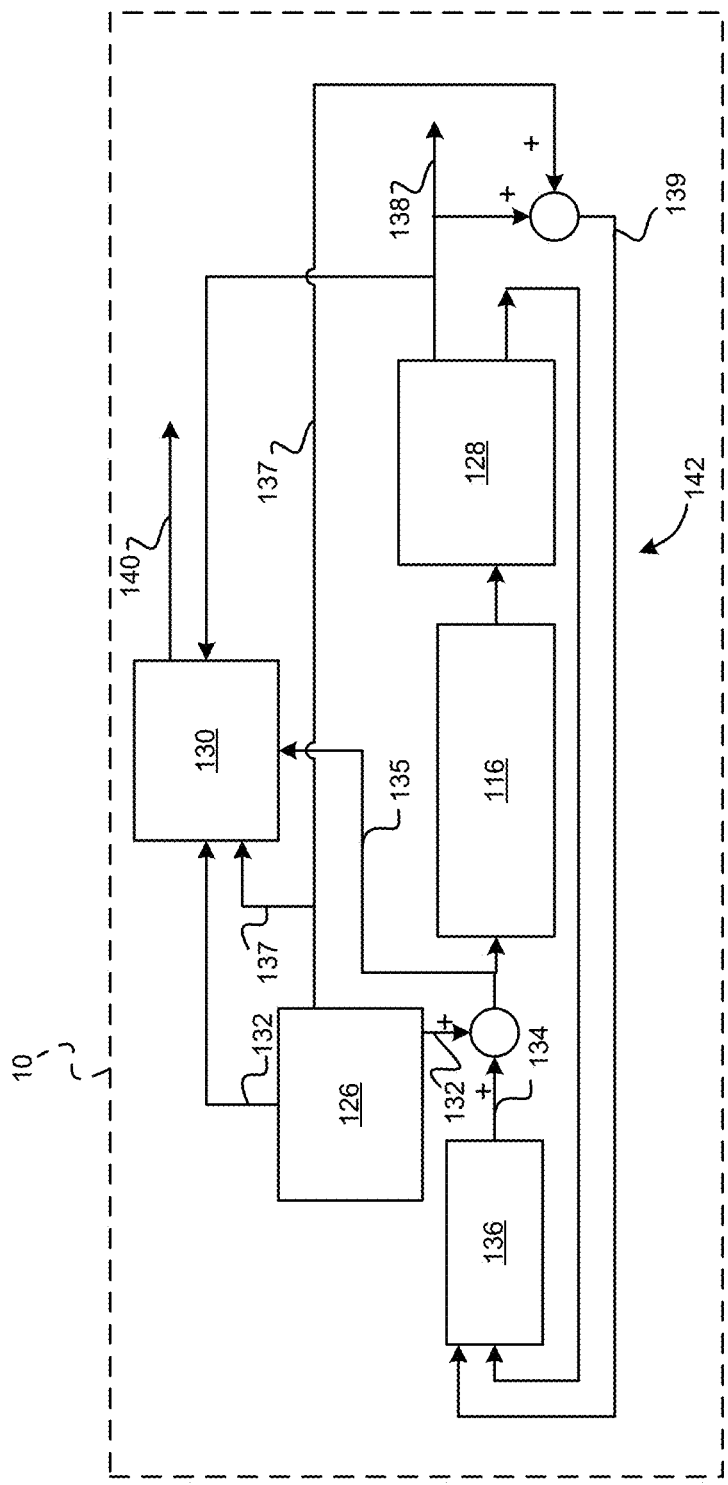
FIG. 2 is a functional block diagram of a system for determining steering performance in accordance with various embodiments.

In particular, as shown in more detail with regard to FIG. 2, the system 10 includes a torque disturbance source 126, at least one measured torque source 128, and a diagnostic module 130. In various embodiments, the system 10 and the steering system 112 may be coupled directly to the vehicle 100 as shown in FIG. 1. For example, when coupled to the vehicle 100, the torque disturbance source 126 and/or the diagnostic module 130 are coupled to a communication bus associated with the control module 116 and can read and generate messages associated with the steering system.

In various other embodiments, the system 10 and the steering system 112 may be coupled to a testing structure, such as a test bench (not shown). For example, when coupled to the testing structure and the tests are performed in a laboratory, the steering system 112 is mounted in its in-vehicle position to the test bench. Linear actuators (not shown) are connected to tie rods of the steering system such that representative reaction loads can be applied. The steering input shaft is grounded through a properly sized inertia wheel and a compliant torsion bar. The system 10 is then coupled through a communication bus or directly to a steering controller and can read and generate messages associated with the steering system 112.

In any of the embodiments, with the systems 10, 112 energized, the torque disturbance source 126 generates a disturbance torque 132, 137 in the form of a sinusoidal wave of suitable amplitude. The disturbance torque 132, 137 is applied to the steering system 112 by summing it with an torque command 134 received from a torque assist control system 136 (which may be part of another control) through, for example, a communication bus, and/or by summing it with a measured torque command 138 from a measured torque source 128. In various embodiments, the torque assist control system 136 may include other functions not described herein, such as, but not limited to, return-to-center control, lane keeping assist, etc. In various embodiments, the torque disturbance source 126 varies the frequency of the disturbance torque 132, 137 within a range of interest (e.g., five to thirty Hz range, with 1 Hz intervals). In various embodiments, the torque disturbance source 126 varies the amplitude of the disturbance torque within a range of interest (e.g., 1 Nm, 2 Nm, 3 Nm). As can be appreciated, other methods of generating the disturbance torque 132, 137 can be implemented in various embodiments.

The measured torque source 128 may include the torque sensor 124 of the steering system 112. The measured torque source 128 measures torque on the steering system 112, for example, at the torsion bar or other location. The measured torque source 128 generates sensor signals 138 that are received directly by the diagnostic module 130 or received indirectly through the communication bus. The measured torque source 128 also communicates measured values such as, but not limited to, steering wheel angle, vehicle velocity, etc. which is provided to the torque assist control system 136.

The diagnostic module 130 receives the generated disturbance torque 132, 137 and the sensor signals 135, 138 and determines stability margins 140 (e.g., gain and phase margins in a Bode plot, and stability margin in a Nyquist plot) of the steering system 112. In the exemplary embodiments discussed herein, the stability margins 140 are associated with torque of the steering system 112. As can be appreciated, in various other embodiments, the same or similar methods and systems can be used to determine stability margins of other parameters of the steering system as the disclosure is not limited to the present examples. As can further be appreciated, in various embodiments, the same or similar methods and systems can be used to determine stability margins in other systems such as, but not limited to, steer-by-wire systems.

In various embodiments, the diagnostic module 130 receives and processes the information without modifying existing closed loop control 142 of the steering system 112. In particular, as shown in FIG. 2, the transfer function from signal 139 to 138 is referred to as an open loop transfer function of the steering torque control loop. The transfer function from signal 135 to signal 134 is referred to as an open loop transfer function of the motor torque control loop. Correspondingly, the diagnostic module 130 applies two torque disturbances, signal 132 and signal 137, to identify the two open loop transfer functions.

For example, the diagnostic module 130 records a set of parameters interpreted from the received signals 132, 135, 137, 138 including motor torque command and torsion bar torque, at each frequency. The diagnostic module 130 then computes a gain margin, a phase margin, and stability margins using Bode plots and Nyquist plots of the recorded data.

Figure 3:
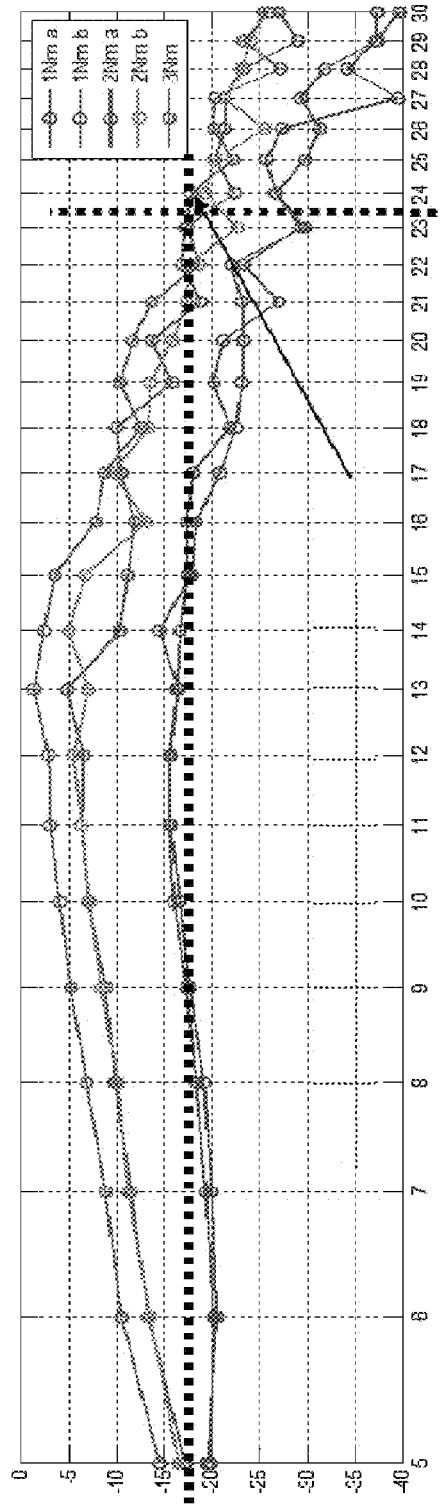
FIGS. 3 and 4 are graphs illustrating exemplary Bode plots that are generated by the system for determining steering performance in accordance with various embodiments.
Figure 4:
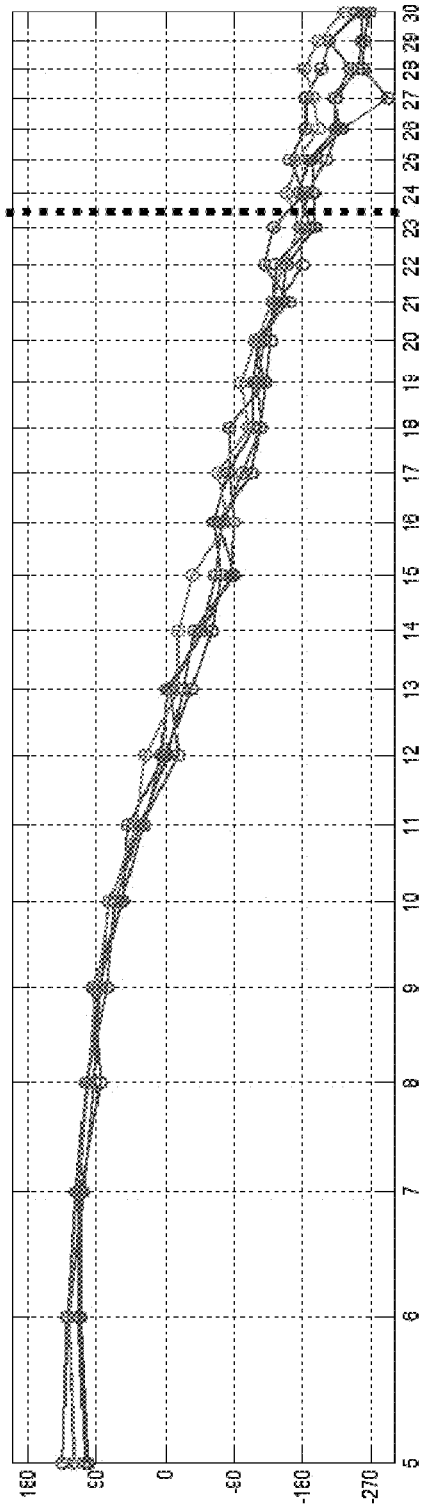

As shown in the exemplary plots of FIGS. 3 and 4, a fast Fourier transform or transform estimate is used to determine a response of the measured torque 138 (relating to the steering torque) to the disturbance torque 137 as:

$$\tilde{d}_1(s) = \frac{T\text{-bar Measure}(s)}{T\text{-Bar Torque Disturbanc}(s)} = \frac{\text{Signal 138 }(s)}{\text{Signal 137 }(s)}. \tag{1}$$

As can be appreciated, techniques other than fast Fourier transform, such as, but not limited to, system identification algorithms can be used to determine the response in various embodiments. $L_1(s)$, the open-loop bode plot from the frequency sweep signal is then calculated as:

$$L_1(s) = \frac{-\tilde{d}_1(s)}{1+\tilde{d}_1(s)} = \frac{-\text{Signal 138 }(s)}{\text{Signal 139 }(s)}; \tag{2}$$

and the gain margin and the phase margin are calculated using $L_1(s)$. As can be appreciated, other signals other than the sweep signal, such as, but not limited to multisine or white noise can be used in various embodiments.

Similarly, a fast Fourier transform or transform estimate is used to determine a response of the measured torque 135 (relating to the motor torque) to the disturbance torque 132 as:

$$\tilde{d}_2(s) = \frac{\text{Signal 135 }(s)}{\text{Signal 132 }(s)}. \tag{3}$$

As can be appreciated, techniques other than fast Fourier transform, such as, but not limited to, system identification algorithms can be used to determine the response in various embodiments. $L_2(s)$, the open-loop bode plot from the frequency sweep signal is then calculated as:

$$L_2(s) = \frac{1-\tilde{d}_2(s)}{\tilde{d}_2(s)} = L_2(s) = \frac{-\text{Signal 134 }(s)}{\text{Signal 135 }(s)}; \tag{4}$$

and the gain margin and the phase margin are calculated using $L_2(s)$. As can be appreciated, other signals other than the sweep signal, such as, but not limited to multisine or white noise can be used in various embodiments.

Stability margins can then be determined from, for example, a Nyquist plot. For example, the stability margin can be determined to be the shortest distance to a critical point on a Nyquist plot. The gain and phase margins and the stability margins 140 are then used to improve control by the control module 116 of the steering system 112 either directly or indirectly.

Figure 5:
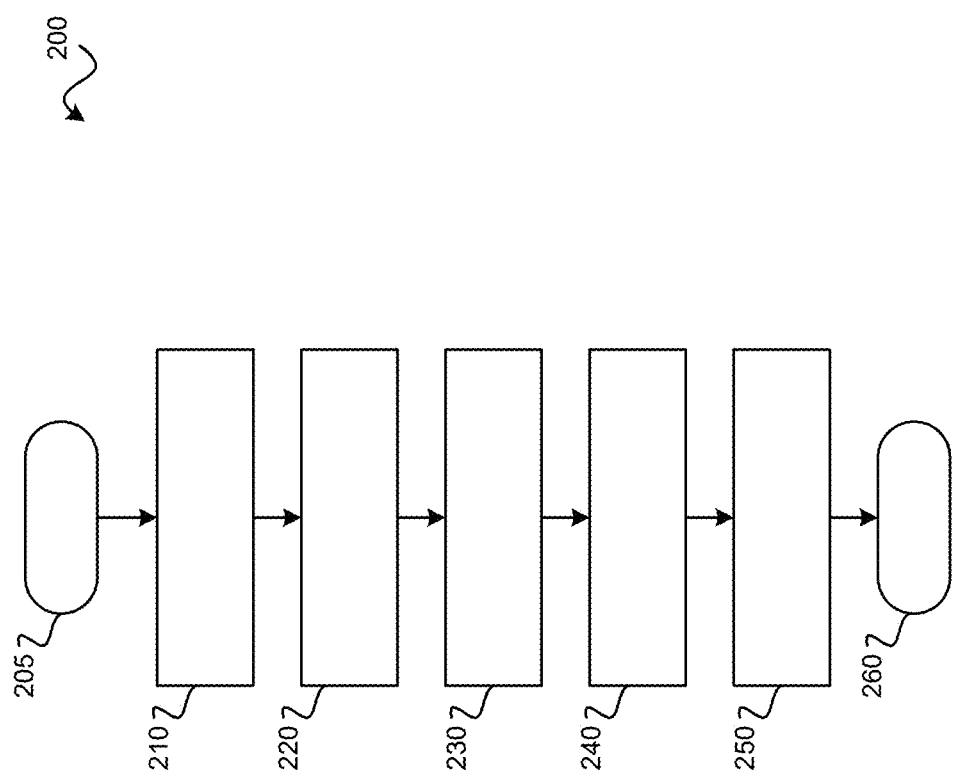
FIG. 5 is a flowchart illustrating a method that may be performed by the system for determining steering performance in accordance with various embodiments.

With reference now to FIG. 5, a flowchart of a method 200 for determining steering performance metrics and controlling a steering system based thereon is shown in accordance with exemplary embodiments. The method 200 can be utilized in connection with the vehicle 100 and the system 10 of FIGS. 1 and 2, in accordance with exemplary embodiments. As can be appreciated in light of the disclosure, the order of operation within the method is not limited to the sequential execution as illustrated in FIG. 5, but may be performed in one or more varying orders as applicable and in accordance with the present disclosure.

As depicted in FIG. 5, the method may begin at 205. The torque disturbance is generated at 210 according to the various frequency and amplitude sweeps as discussed above. The torque disturbance and the measured torque are received and recorded at 220. The Bode plots are then computed for example, as discussed above, at 230 and the stability margins are computed from the Bode plots and a Nyquist Plot for example, as discussed above, at 240. Thereafter, the steering system is controlled using performance variables or based on design changes derived from the stability margins at 250 and the method may end at 260.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for determining a performance of a steering system, comprising:
    generating a torque disturbance signal;
    applying the torque disturbance signal to a torque command of the steering system;
    measuring a value of torque on the steering system;
    recording the measured value and a value associated with the torque disturbance signal;
    computing at least one performance metric of the steering system based on the recorded measured value and the recorded value associated with the torque disturbance signal; and
    selectively improving the steering system based on the at least one performance metric.

2. The method of claim 1, wherein the generating the torque disturbance signal comprises generating the torque disturbance signal at a number of frequencies within a range.

3. The method of claim 1, wherein the generating the torque disturbance signal comprises generating the torque disturbance signal at a number of amplitudes within a range.

4. The method of claim 1, wherein the generating the torque disturbance signal comprises generating the torque disturbance signal at a number of frequencies within a first range for a number of amplitudes within a second range.

5. The method of claim 1, wherein the measuring the value of torque includes measuring torque applied to a torsion bar of the steering system and torque command to a control module.

6. The method of claim 1, wherein the computing the performance metrics is based on Bode plots and Nyquist plots.

7. The method of claim 1, wherein the at least one performance metric includes stability margins.

8. The method of claim 7 wherein the stability margins include a gain margin.

9. The method of claim 7, wherein the stability margins include a phase margin.

10. A system for determining a performance of a steering system, comprising:
    a torque disturbance source that generates a torque disturbance signal;
    a measured torque source that generates measured torque data based on a torque measured from the steering system; and
    a diagnostic module that, by a processor, receives the torque disturbance signal and the measured torque data, computes at least one performance metric of the steering system based on the torque disturbance signal and the measured torque data, and outputs one or more signals used to improve control of the steering system based on the at least one performance metric.

11. The system of claim 10, wherein the torque disturbance source generates the torque disturbance signal at a number of frequencies within a range.

12. The system of claim 10, wherein the torque disturbance source generates the torque disturbance signal at a number of amplitudes within a range.

13. The system of claim 10, wherein the torque disturbance source generates the torque disturbance signal at a number of frequencies within a first range for a number of amplitudes within a second range.

14. The system of claim 10, wherein the torque measured of the steering system includes torque applied to a torsion bar of the steering system and torque command to a control module.

15. The system of claim 10, wherein the diagnostic module computes the performance metrics based on Bode plots and Nyquist plots.

16. The system of claim 10, wherein the at least one performance metric includes stability margins.

17. The system of claim 16 wherein the stability margins include a gain margin.

18. The system of claim 16, wherein the stability margins include a phase margin.

19. A system for determining a performance of a steering system, comprising:
    a torque disturbance source that generates a torque disturbance signal at a number of frequencies within a first range for a number of amplitudes within a second range;
    a measured torque source that generates measured torque data based on a torque measured from a torsion bar of the steering system; and
    a diagnostic module that, by a processor, records the torque disturbance signal and the measured torque data, computes stability margins of the steering system from Bode plots that are based on the torque disturbance signal and the measured torque data, and outputs one or more signals used to improve control of the steering system based on the stability margins.

* * * * *